(12) United States Patent
Bonilla (10) Patent No.: US 7,392,149 B2
(45) Date of Patent: Jun. 24, 2008

(54) AUTOMATIC SOFTWARE TESTING (75) Inventor: Carlos A. Bonilla, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 132 days.

(21) Appl. No.: 10/685,990

(22) Filed: Oct. 14, 2003

(65) Prior Publication Data

US 2005/0080584 A1    Apr. 14, 2005

(51) Int. Cl.
*G06F 19/00* (2006.01)
(52) U.S. Cl. ...................................................... 702/123
(58) Field of Classification Search ................. 702/123, 702/119; 714/2, 37, 38; 324/158; 717/124, 717/127; 712/22; 29/830; 348/345; 709/223; 710/120
See application file for complete search history.

(56) References Cited

U.S. PATENT DOCUMENTS

| | | | | | |
|---|---|---|---|---|---|
| 5,513,315 | A | * | 4/1996 | Tierney et al. | 714/37 |
| 6,094,531 | A | * | 7/2000 | Allison et al. | 717/176 |
| 6,317,845 | B1 | * | 11/2001 | Meyer et al. | 714/23 |
| 2003/0051186 | A1 | * | 3/2003 | Boudnik et al. | 714/2 |

FOREIGN PATENT DOCUMENTS

JP       2001-243089       *   9/2001

* cited by examiner

*Primary Examiner*—Tung S Lau (57) ABSTRACT

A computer implemented method of automatic software testing. Status information of a software test running on a test system is stored to a common information point. The common information point is typically on a computer system independent from a computer system running the software test. An operating system on the test system is reinitialized. The operating system may be changed. The common information point is queried to determine the status information and the software test is resumed. The testing may be resumed at a point immediately after a last completed test operation.

20 Claims, 4 Drawing Sheets

AUTOMATIC SOFTWARE TESTING

TECHNICAL FIELD

Embodiments of the present invention relate to automatic software testing.

BACKGROUND ART

An important portion of a software development process is the testing of the software. Testing normally occurs in several phases, for example, engineering test, development test, alpha testing and beta testing. Such testing helps to ensure that a software product meets its requirements, including functioning in the target hardware and software environment.

Numerous tools have been developed to facilitate software testing. Prominent among such tools is the Test Environment Toolkit (TET), commercially available from The Open Group of San Francisco, Calif. It is to be appreciated that The Open Group and others offer a variety of products, including successors to TET. Another well known testing tool is "Xrunner," commercially available from Mercury Interactive of Sunnyvale, Calif.

Such testing tools generally automate functional testing to ensure that applications work as expected. They may record business processes into test scripts, allow for script enhancements as the application is developed or updated, execute scripts, report results and enable script reusability when an application is modified or upgraded. Test tools generally take the form of a test driver that uses a framework to support testing across multiple hardware platforms and/or operating systems. Such toolkits can handle administration, reporting and sequencing of tests, providing a common user interface for a test administrator to develop tests.

Unfortunately, as software complexity has continued to increase, such existing tools have been found to be lacking certain functions or capabilities. For example, existing tools generally do not enable test systems to be reinstalled during testing. This deficiency is particularly problematic if the target application requires installation of new software as part of the solution. Such a capability would also be useful to capture a benefit of testing multiple levels of a software solution as they become available, without discarding test results from previous testing.

Another desirable test function not presently available is the ability of a test system to reboot, e.g., restart an operating system, during the test. Restarting, or reinitializing, an operating system during a test has numerous benefits, including recovery from fault conditions and automated testing of different operating systems without human intervention.

Still another desirable feature not presently available is support for multiple synchronizations of multiple test systems in a testing environment.

Unfortunately, no existing software test systems provide these functions.

Thus a need exists for automatic software testing. A further need exists for automatic software testing which enables reinstallation test systems and rebooting of operating systems during testing. A still further need exists to meet the previously identified needs in a manner that is complimentary and compatible with conventional computer system testing systems and processes.

SUMMARY OF THE INVENTION

Embodiments of the present invention provide for automatic software testing. Further embodiments of the present invention provide automatic software testing which enables reinstallation test systems and rebooting of operating systems during testing. Still further embodiments of the present invention meet the previously identified need in a manner that is complimentary and compatible with conventional computer system testing systems and processes.

A computer implemented method of automatic software testing is disclosed. Status information of a software test running on a test system is stored to a common information point. The common information point is typically on a computer system independent from a computer system running the software test. An operating system on the test system is reinitialized. The operating system may be changed. The common information point is queried to determine the status information and the software test is resumed. The testing may be resumed at a point immediately after a last completed test operation.

BEST MODES FOR CARRYING OUT THE INVENTION

In the following detailed description of the present invention, automatic software testing, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

NOTATION AND NOMENCLATURE

Some portions of the detailed descriptions which follow (e.g., processes 300 and 400) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "initializing" or "computing" or "translating" or "calculating" or "determining" or "querying" or "displaying" or "recognizing" or "generating" or "demarking" or "transferring" or "synchronizing" or "accessing" or "retrieving" or "conveying" or "sending" or "resuming" or "installing" or "gathering" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The term "daemon" is generally understood to refer to or to describe a particular class of computer program; usually a process which runs in the background, rather than under the direct control of a user. Daemons are often launched at system start-up time, and often serve the function of responding to network requests, hardware activity, or other programs by performing some task.

AUTOMATIC SOFTWARE TESTING

In a general software testing environment, it is desirable to have a suite of tests running on one or more test systems. A test may involve synchronization between different test systems. It is to be appreciated that, in general, a test is actually running on the test system(s), rather than running from a remote location.

A case in which a test is running on a single test system will be discussed. It is to be appreciated that embodiments in accordance with the present invention are well suited to running multiple tests across multiple test systems.

Testing is typically controlled by a test script, e.g., a list of actions (individual tests) to be performed in a sequence. In some situations it can be highly desirable to reboot, reinstall and/or change the operating system running on the test system. There are numerous reasons to reboot, reinstall and/or change an operating system. For example, rebooting an operating system can be used to test software recovery from various real faults that can cause an operating system to reboot, including, for example, operating system faults, hardware faults and power interruptions.

It is to be appreciated that it is possible for software under test to actually render a host operating system unstable and/or inoperative. Such conditions can sometimes be detected. At other times, it may be desirable to reinstall an operating system to establish a known testing environment prior to continuing testing. In these situations and others, it may be desirable to reinstall an operating system.

Likewise, it may be desirable to change operating systems in a controlled and automated manner during testing. For example, if an application program is intended to operate under a variety of related operating systems, e.g., versions 1.0-1.3 of an operating system, changing operating systems on a single (or set of) test computer(s) can enable test coverage of all operating system versions in a resource efficient manner.

A test master process runs on a test master computer system that is not under test. The test master process "watches over" or monitors the progress of the test. The test master process distributes the test to the test systems.

The test master process installs a test driver on the test system. A test driver is independent of the test, but which conducts or runs the test, e.g., follows the test script, on the test system.

All test definitions, test scripts and testing software, e.g., test driver, are in a control repository. The control repository may be a part of a test master computer system, but is typically less associated with the actual test hardware. For example, a control repository can be a directory on a file server or storage area network (SAN). These items are set up and stored prior to running the tests. Test definitions specify the type of test systems required to run the tests, e.g., processor, operating system and hardware requirements.

The control repository also points to which scripts are to be used to run the tests on the test systems. Tests also include definitions of synchronization points and virtual system names. The test master process determines which real systems will be used to conduct the test and provides a mapping of actual (real) system names to the virtual system names of the test definitions.

Each test case typically comprises the information about the requirements for running the test case, including synchronization points. For example, consider a test running on a plurality of test systems. A first step for each test case may be to install a software application, or a component of a software application on each of the test systems. A synchronization point in a test script executing on each test system may, for example, halt execution of test script on each system until the installation is complete on all systems.

The test master manages a common point of information and communication for the test. Such a common point of information and communication can be, for example, a well known network file system (NFS) mount point common to all of the systems. The test master process installs a test driver on each test system, which runs as a daemon on the test system and each driver determines its test information from the common point. The test master is responsible for determining if a test system has been reinstalled and no longer has the test driver running, at which point it reinstalls the test driver.

The common point of information is used by each test system to indicate which test step it is on or has completed. This allows a test case to be reentrant for a specific step for a test case, which involves any number of reboots. For example, a test case can cause its host system to reboot at step three. Rebooting an operating system will generally halt execution of software testing on that system. After the reboot process, testing software can regain control. Upon checking the common information point to determine which steps or portions of the test have been completed, the testing software can resume testing after the last completed portion, e.g., after step three. This common point is also used to indicate when test systems are waiting for other test systems to reach a certain step, to allow for synchronization at any number of points between any number of test systems.

In accordance with embodiments of the present invention, the test master, test driver and individual test definitions are decoupled. The test cases do not have to have test case specific methods for determining when and for which systems they have to synchronize to.

Once the data is set up and the test master has determined the real systems that are to be used for the test, the common information point is established. The common information point stores and makes available to the test systems the mapping of real systems to virtual. The test master installs a test driver on each test system.

For example, three test cases are to be run. Test system requirements are contained in the test scripts. E.g., the test cases need two virtual systems with requirements X and Y. The test master accesses a list of real test systems that are available and provides mapping of virtual systems to real systems that meet those X and Y requirements. The test master installs a test driver on each system.

A test driver queries the common information point to determine what, if any, tests to run. The test driver then downloads and runs the test. Test actions are typically defined by scripts. When a test driver completes a step, or test portion, it notifies the common information point of that it has completed that step. A synchronization requirement can cause a test driver to query common information point for notification that other test processes have completed particular steps.

The test master monitors the progress of all tests. Tests can complete, for example, with a pass/fail result. The test master records overall results of the testing. Alternatively, a step of a test can indicate that the test system needs to reinstall itself and/or reinitialize an operating system of the test system. It is to be appreciated that the operating system to be installed can differ from the previous operating system. For example, a first set of tests can be conducted on a first type of operating system. Subsequently, a second type of operating system can be installed and a second set of tests, similar or different in comparison to the first set of tests, can be conducted.

A test process, via a test driver, can write information, e.g., a flag, to the common information point to indicate that the test process is rebooting, reinstalling and/or changing the operating system. It is to be appreciated that these actions can be represented with a single flag, a unique flag for each item, or flagged in combination in accordance with embodiments of the present invention. The test master then monitors the test system to ensure that operating system install completes. After the operating system is installed, the test master initializes a test driver (which may require a download) on the test system.

After installation, the test driver accesses the common information point to determine which step of its test script is to be executed. Installation of an operating system typically wipes out any application software, e.g., test drivers. Tests typically continue after a reboot, and tests are able to continue when an operating system is installed on a test system in the middle of testing.

The test drivers running on test systems automatically restart when a test system is rebooted. If the test driver has been installed on system with a new operating system, the test driver accesses status information stored common information point to determine test scripts to run, etc.

Figure 1:
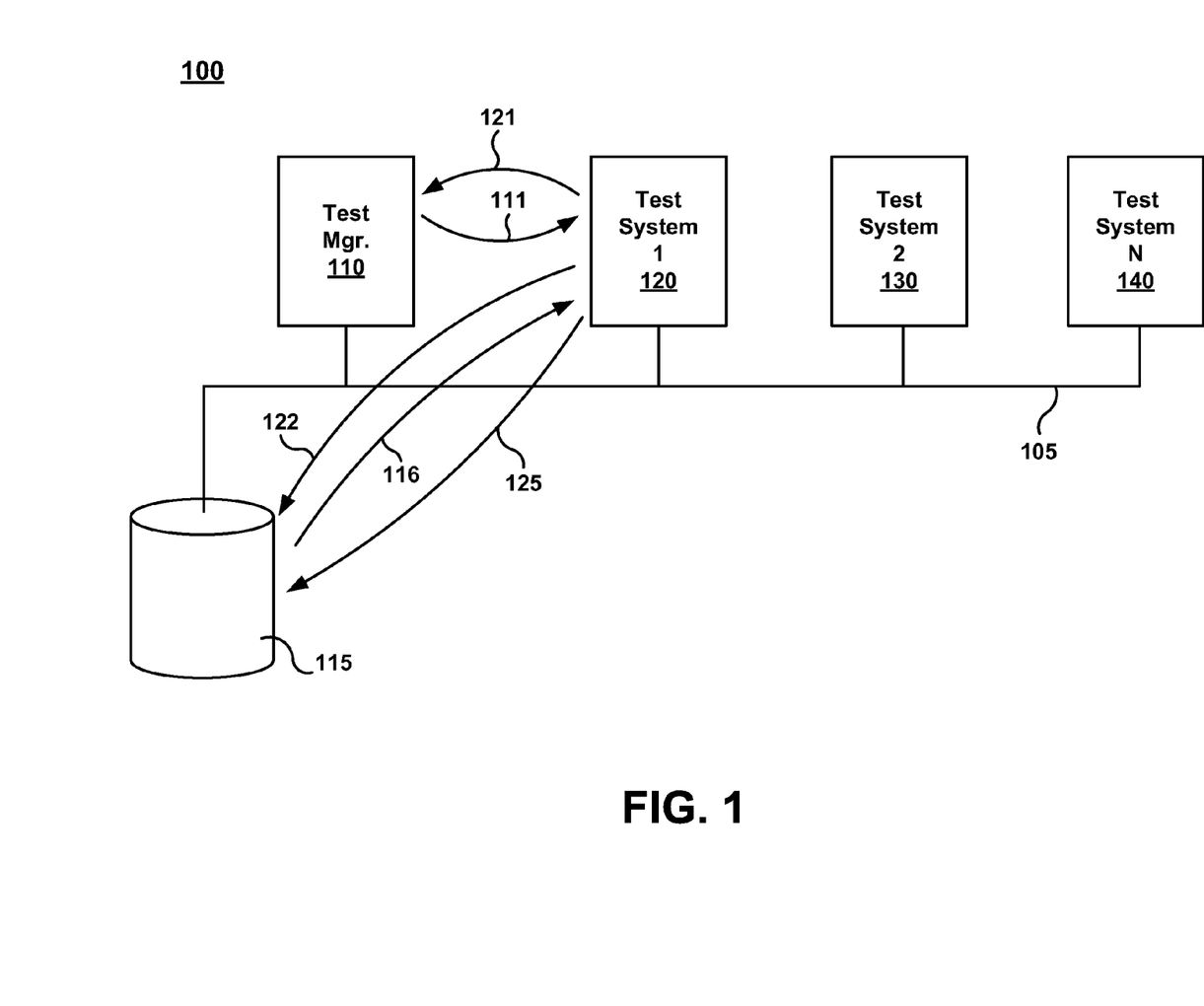
FIG. 1 is a data flow diagram that illustrates some of the communication within a test environment, in accordance with embodiments of the present invention.

FIG. 1 is a data flow diagram that illustrates some of the communication within a test environment 100, in accordance with embodiments of the present invention. Test environment 100 comprises a test manager computer system 110 and a plurality of test computer systems 120, 130 and 140. Test computer systems 120-140 can be similarly configured or they can be quite different. The test computer systems 120-140 are communicatively coupled to test manager computer system 110, for example, via an Ethernet local area network (LAN).

Test environment 100 further comprises a common information point 115. Common information point 115 is a computer usable storage media, which may reside within test manager 110. Alternatively, common information point 115 may be a portion of a separate computer system, a network file server or a storage area network (SAN) or the like. Common information point 115 is communicatively coupled to test manager computer system 110 and test systems 120-140.

Common information point 115 can comprise, for example, a network file system mount point common to computer systems 110-140.

After test system 120 initializes its operating system (for the first and/or a subsequent time), it notifies (121) the test manager computer system 110. Such notification indicates test system 120's availability. Responsive to notification 121, test manager computer system 110 installs (111) a test driver on test system 120. The test driver on test system 120 then queries (122) common information point 115 to determine any status associated with a current test. In the case of a current test, reply 116 from common information point 115 to test system 120 indicates the last portion, or stage, of the test that was completed. Test system 120 would then typically resume testing at the next point after the last stage completed. Communication 125 indicates test system 120 storing information of its test status, typically included stage(s) completed, to common information point 115. Similar communications occur between test systems 130-140 and test manager computer system 110 and common information point 115.

It is often desirable to synchronize testing among various test systems, e.g., test systems 120-140. By reporting test status information to common information point 115, each test system can access test status information of other test systems in order to coordinate testing.

For example, consider that it is desired that no test system progress beyond step four before the other systems complete step four. When each system completes a step, it stores information of that completed step on common information point 115. Prior to beginning step five, each system checks the other system's test status information on common information point 115 to determine if they have completed step four. If any have not completed step four, the systems that have completed step four wait. When all have completed step four, step five can be started.

Figure 2:
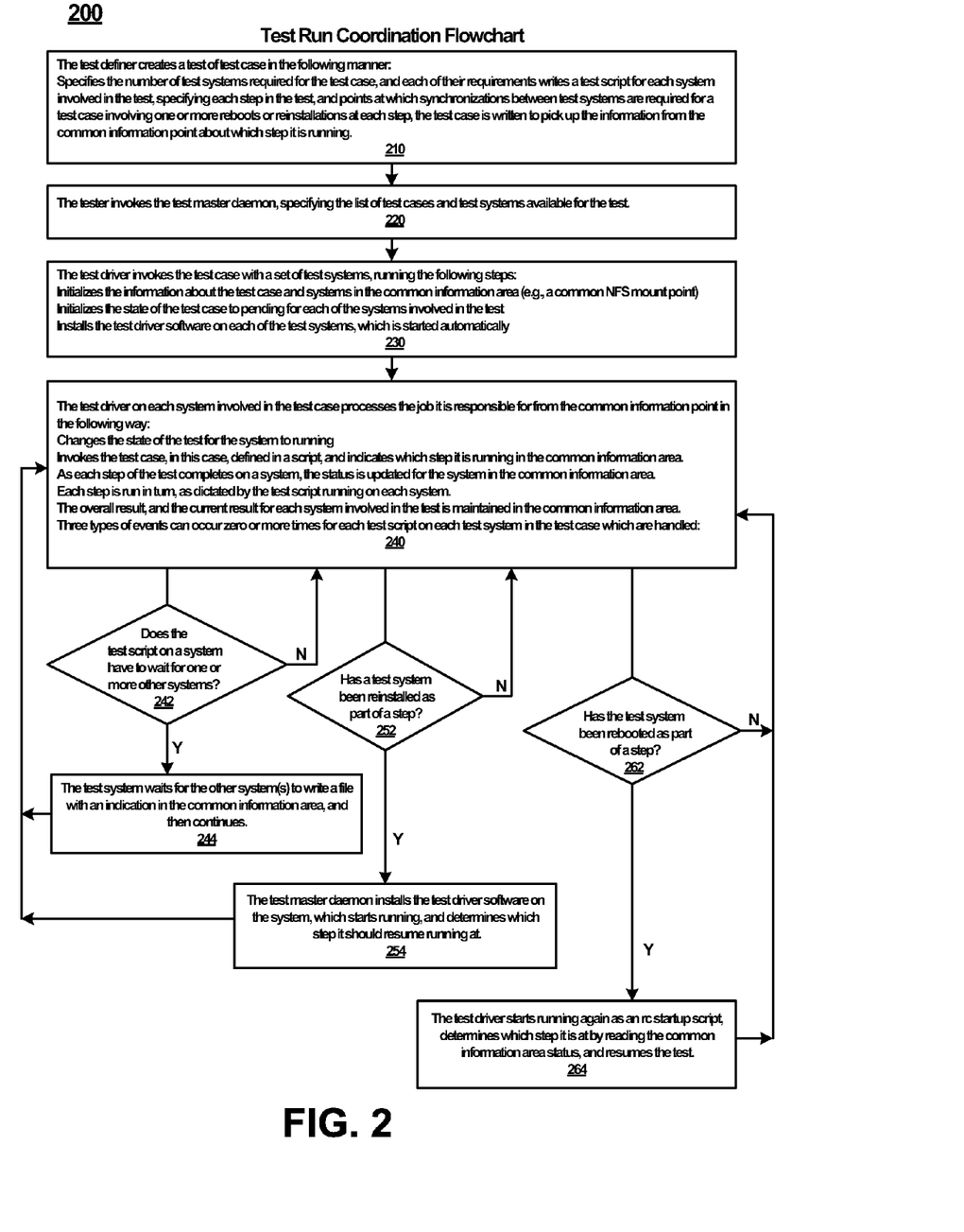
FIG. 2 illustrates an exemplary test run coordination flowchart, in accordance with embodiments of the present invention.

FIG. 2 illustrates an exemplary test run coordination flowchart 200, in accordance with embodiments of the present invention. It is to be appreciated that blocks 210 and 220 are typically performed by a person, e.g., a test administrator and/or test definer. Blocks 230 through 264 generally represent computer automated processes.

In block 210 the test definer creates a test case. In block 220 the test definer invokes the test master daemon, e.g., a software process running on test master computer system 110.

In block 230 a test driver invokes the test case. In block 240, the test driver on each system involved in the test case processes the job that it is responsible for fro the common information point. In block 242, the test script is tested for synchronization requirements. If there are synchronization requirements, flow passes on to block 244. If there are no synchronization requirements, flow returns to block 240.

If there were synchronization requirements in block 242, then in block 244 the test system waits for the other system(s) to write a file with an indication in the common information area, and then process flow continues to block 240.

In block 252, a test script environment is tested to determine if a test system has been reinstalled as part of a testing step. If a test system has been reinstalled as part of a testing step, flow continues at block 254. If a test system has not been reinstalled as part of a testing step, flow continues at step 240.

If a test system has been reinstalled as part of a step, then in block 254 the test aster daemon installs the test driver software on the test system, which starts running. The test driver software determines which step is should resume running at, e.g., by inquiring of a common information point. Subsequently, process flow continues at block 240.

In block 262, a test script environment is tested to determine if a test system has been rebooted as part of a testing step. If a test system has been rebooted as part of a testing step, process flow continues to block 264. If a test system has not been rebooted as part of a testing step, process flow continues at block 240.

If a test system has been rebooted as part of a testing step, then in block 264 the test driver starts running again as an "rc startup" script, determines which step it is at b reading the common information are status, and resumes the test. Resumption of testing continues to block 240.

Figure 3:
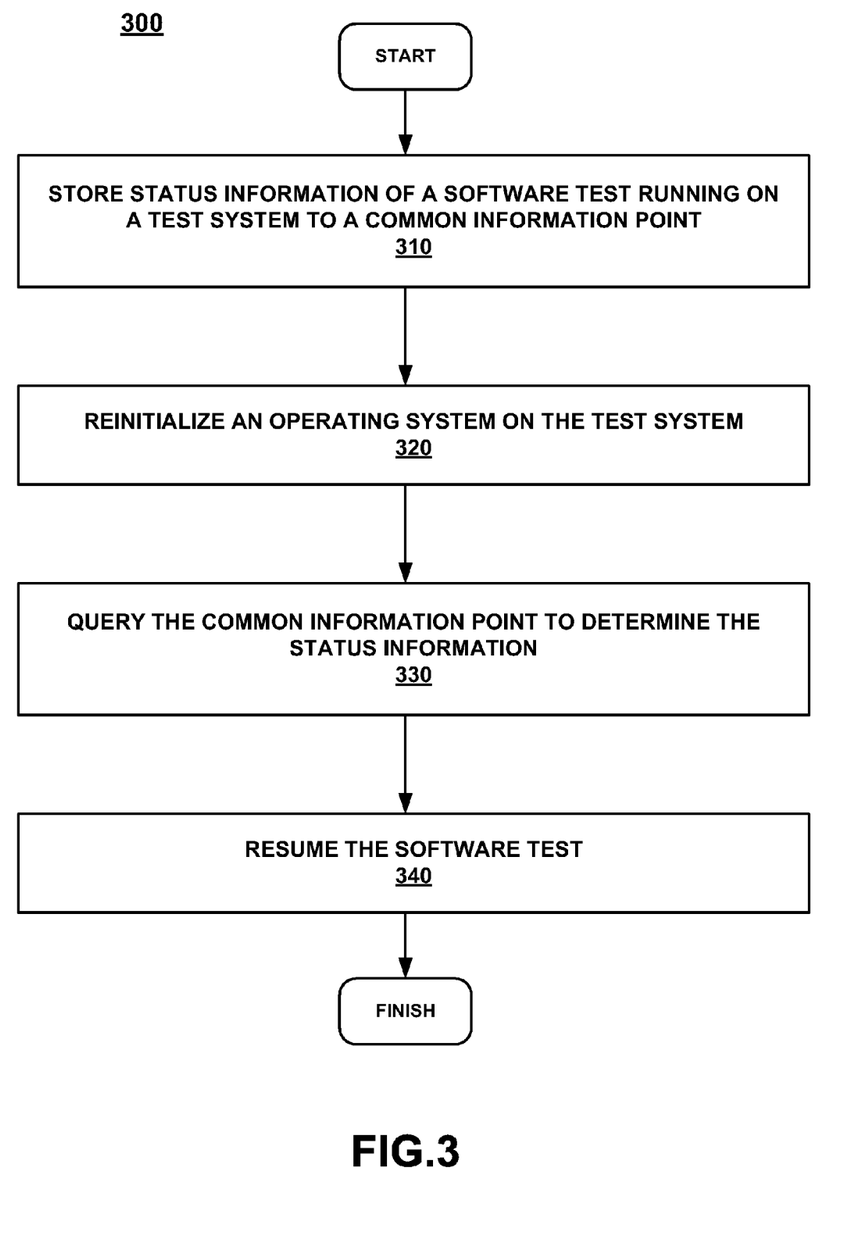
FIG. 3 is a flow chart illustrating a computer implemented method of automatic software testing, in accordance with embodiments of the present invention.

FIG. 3 is a flow chart illustrating a computer implemented method 300 of automatic software testing, in accordance with embodiments of the present invention. In block 310, status information of a software test running on a test system is stored to a common information point. A common information point is an information store, e.g., a file, common to and accessible by a plurality of test systems. A common information point can be implemented, for example, as a network file system mount point. Status information can include any information about the test, and generally includes identification information about test portions, or steps of a test script, that have been completed. For example, "tests 2, 3 and 4 have completed." Status information typically also includes information as to the results of a particular test, or portion of a test, e.g., pass or fail.

In block 320, an operating system on the test system is reinitialized. Typically, the reinitialization is performed under software control in response to a command in a test script. However, it is to be appreciated that embodiments in accordance with the present invention are well suited to operating system reinitializations due to a wide variety of causes, e.g., operating system error, hardware errors (including loss of power), error trapping software and the like.

In block 330, the common information point is queried to determine the status information. In accordance with embodiments of the present invention, the query operation can be started by a "start up" process initiated by the operating system. Examples of such processes include "autoexec.bat" and "rc startup." In block 340, the software test is resumed.

In accordance with embodiments of the present invention, a software test process can resume at a point subsequent to a last test portion completed. For example, if tests one through three but not test four are complete prior to an operating system reinitialization, the software test process can resume with test four after the operating system reinitialization. In general, this is a highly desirable behavior and results in a well-controlled test flow.

In accordance with still other embodiments of the present invention, a test system can run a different operating system subsequent to reinitializing than the test system was running prior to the reinitialization. For example, the test system can conduct tests on version 1.1 of an operating system, then reinitialize to version 1.2 of an operating system and continue testing. This capability is highly desirable to test a single software product across multiple levels of operating systems in an efficient, automated manner. It is to be appreciated that similar as well as highly different operating systems can be utilized on either side of a reinitialization action in accordance with embodiments of the present invention.

In addition, testing different software on the same or different operating systems is well suited to embodiments in accordance with the present invention. Testing different software products can allow for optimizing usage of limited test hardware.

Figure 4:
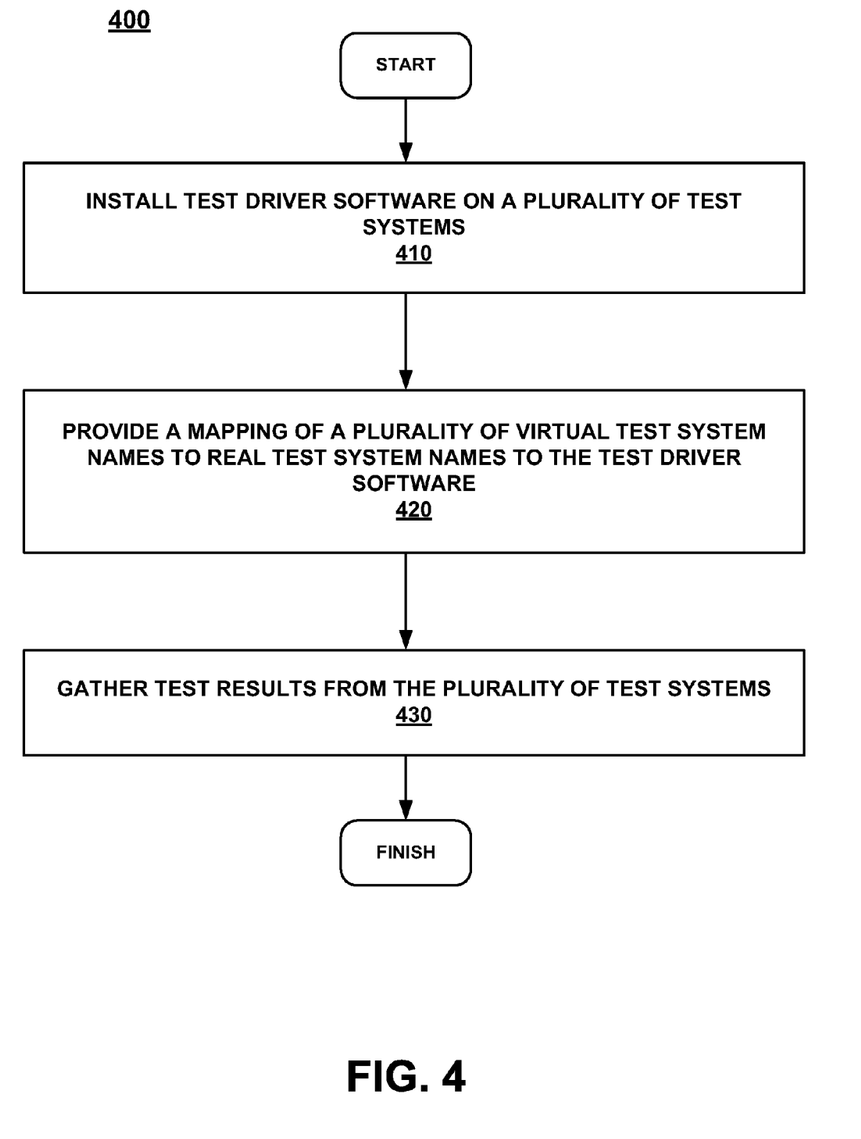
FIG. 4 is a flow chart illustrating a computer implemented method of automatic software testing, in accordance with embodiments of the present invention.

FIG. 4 is a flow chart illustrating a computer implemented method 400 of automatic software testing, in accordance with embodiments of the present invention. In block 410, test driver software is installed on a plurality of test systems. In accordance with embodiments of the present invention, the installation of test driver software can be responsive to a "start up" process invoked, or automatically initiated, by a test system operating system. The test systems need not be similar, and the test driver software can further differ from system to system.

In block 420, a mapping of a plurality of virtual test systems names to real test system names is provided to the test driver software. This enables test cases to be configured generically using virtual names without knowledge of a physical installation.

In block 430, test results are gathered from the plurality of test systems. In accordance with embodiments of the present invention, a common point of information, e.g., a network file system mount point accessible to all systems, is identified to the test systems. Typically, this identification is performed by a test master process operating on a separate computer system.

In accordance with embodiments of the present invention, the test results can be gathered from the common point of information.

Embodiments of the present invention provide for automatic software testing. Further embodiments of the present invention provide automatic software testing which enables reinstallation test systems and rebooting of operating systems during testing. Still further embodiments of the present invention meet the previously identified need in a manner that is complimentary and compatible with conventional computer system testing systems and processes.

Embodiments in accordance with the present invention, automatic software testing, are thus described. While the present invention has been described in particular embodiments, it should be appreciated that the present invention should not be construed as limited by such embodiments, but rather construed according to the below claims.

What is claimed is:

1. A computer implemented method of automatic software testing comprising:

initiating a software test comprising a plurality of test portions on a test system;

providing status information about said software test running on said test system to a common information point, said status information comprising identification of any of said plurality of test portions that have been completed by said test system and any results from any of said plurality of test portions that have been completed;

automatically reinstalling an operating system on said test system in response to reinstall command provided by at least one of said plurality of test portions;

querying said common information point to determine said status information comprising identification of any of said plurality of test portions that were completed by said test system prior to said reinstalling of said operating system and any remaining of said plurality of test portions; and resuming said software test at a first of said remaining of said plurality of test portions after said reinstallation of said operating system.

2. The method of claim 1 wherein said common information point is on a computer system independent from a computer system running said software test.

3. The method of claim 1 wherein said reinstalling is performed under software control.

4. The method of claim 1 wherein said querying is started by a start-up process, said start up process automatically initiated by said operating system.

5. The method of claim 1 wherein said status information comprises an identification test portions completed.

6. The method of claim 1 wherein said test system is running a different operating system subsequent to said reinstalling than said test system was running prior to said reinstalling.

7. The method of claim 5 wherein said resuming restarts said software test at point subsequent to a last test portion completed.

8. A computer implemented method of automatic software testing comprising:
   installing test driver software comprising a plurality of test portions on a plurality of test systems;
   evaluating said test driver software for at least one synchronization requirement within said plurality of test portions;
   providing a mapping of a plurality of virtual test system names to real test system names to said test driver software;
   providing a test status for each of said plurality of test portions completed by each of said plurality of test systems to a common information point;
   monitoring said test status for each of said plurality of test portions completed by each of said plurality of test systems at said common information point to maintain synchronization between said plurality of test systems when said test driver software includes said at least one synchronization requirement;
   automatically reinstalling an operating system on said plurality of test systems in response to reinstall command provided by at least one of said plurality of test portions;
   querying said common information point to determine which of said plurality of test portions were completed by said plurality of test systems prior to said reinstalling of said operating system; and
   resuming said software test on a next of said plurality of test portions remaining after said reinstallation of said operating system.

9. The method of claim 8 further comprising identifying said common point of information to said plurality of test systems.

10. The method of claim 9 wherein said test results are gathered from said common point of information.

11. The method of claim 9 wherein said mapping resides on said common point of information.

12. The method of claim 9 wherein said common point of information is a network file system mount point common to all test systems.

13. The method of claim 9 wherein said installing is responsive to a start up process, said start up process automatically initiated by said operating system.

14. A computer system for automatic software testing comprising:
   a plurality of test computer systems for performing a test comprising a plurality of test portions, said plurality of test portions including a command to perform an automatic reinstall of an operating system of at least one of said plurality of test computer systems;
   a test master computer system communicatively coupled to said plurality of test computer systems, said test master computer system installing a test driver on at least one of said plurality of test computer systems;
   a common information point communicatively coupled to said plurality of test computer systems, said common information point receiving and storing test status information for each of said plurality of test portions completed by at least one of said plurality of test systems such that in response to an automatic reinstall of said operating system of at least one of said plurality of test computer systems, said test driver will query said common information point to determine which of said plurality of test portions were completed prior to said reinstalling of said operating system and which of said test portions remain pending for said at least one of said plurality of test computer systems.

15. The computer system of claim 14 wherein said test master computer system is distinct from said plurality of test computer systems.

16. The computer system of claim 14 wherein said reinitializing is performed under software control.

17. The computer system of claim 14 wherein said querying is started by a start up process, said start up process automatically initiated by said operating system.

18. The computer system of claim 14 wherein said status information comprises an identification of test portions completed.

19. The computer system of claim 14 wherein said at least one of said plurality of test computer systems is running a different operating system subsequent to sad reinstalling than said at least one of said plurality of test computer systems was running prior to said reinstalling.

20. The computer system of claim 18 wherein said resuming starts said software test at point subsequent to a last test portion completed.

* * * * *

UNITED STATES PATENT AND TRADEMARK OFFICE
CERTIFICATE OF CORRECTION

PATENT NO. : 7,392,149 B2 Page 1 of 1
APPLICATION NO. : 10/685990
DATED : June 24, 2008
INVENTOR(S) : Carlos A. Bonilla It is certified that error appears in the above-identified patent and that said Letters Patent is hereby corrected as shown below:

In column 9, line 2, in Claim 4, delete "start-up" and insert -- start up --, therefor.

In column 9, line 5, in Claim 5, after "identification" insert -- of --.

In column 10, line 44, in Claim 19, delete "sad" and insert -- said --, therefor.

In column 10, line 48, in Claim 20, delete "starts" and insert -- restarts --, therefor.

Signed and Sealed this

Eleventh Day of November, 2008

JON W. DUDAS
*Director of the United States Patent and Trademark Office*